United States Patent [19]
Marchlenski

[11] Patent Number: 5,264,967
[45] Date of Patent: Nov. 23, 1993

[54] LENS FOCUSING ADJUSTMENT MECHANISM

[76] Inventor: Stanley P. Marchlenski, 3420 Loper Rd. NE., Newark, Ohio 43055

[21] Appl. No.: 986,938

[22] Filed: Dec. 8, 1992

[51] Int. Cl.⁵ ................................................ G02B 7/02
[52] U.S. Cl. ................................. 359/822; 359/826; 359/384; 359/425
[58] Field of Search ............... 359/822, 823, 825, 826, 359/368, 379, 382, 383, 384, 425, 426, 427, 428, 429, 399, 405, 406, 365

[56] References Cited

U.S. PATENT DOCUMENTS

| | | |
|---|---|---|
| 1,120,014 | 12/1914 | Bishop . |
| 1,521,067 | 12/1924 | Bean . |
| 1,576,340 | 3/1926 | LeProvost . |
| 2,051,050 | 8/1936 | Langsner ............................ 359/426 |
| 2,843,013 | 7/1957 | Keuffel et al. ...................... 359/426 |
| 3,051,045 | 8/1962 | Misuraca ............................ 359/425 |
| 3,768,885 | 10/1973 | Boughton et al. ................. 359/379 |
| 4,204,732 | 5/1980 | Maeda et al. ...................... 355/55 |
| 4,591,245 | 5/1986 | Schreiter ............................ 359/365 |
| 4,684,225 | 8/1987 | Klark et al. ........................ 359/379 |

OTHER PUBLICATIONS

Sky & Telescope, May 1986, pp. 511–513.
Sky & Telescope, Jan. 1987, pp. 95–96.
Machine Design, Dec. 21, 1967 "ROLAMITE" four pages.

Primary Examiner—Loha Ben
Attorney, Agent, or Firm—Sidney W. Millard

[57] ABSTRACT

A focusing mechanism for telescopes, microscopes and the like uses a tensioned strap circumscribing a pair of wheels in a generally S-shape whereby rotation of the wheels moves the eye piece of the scope to proper focus location.

20 Claims, 2 Drawing Sheets

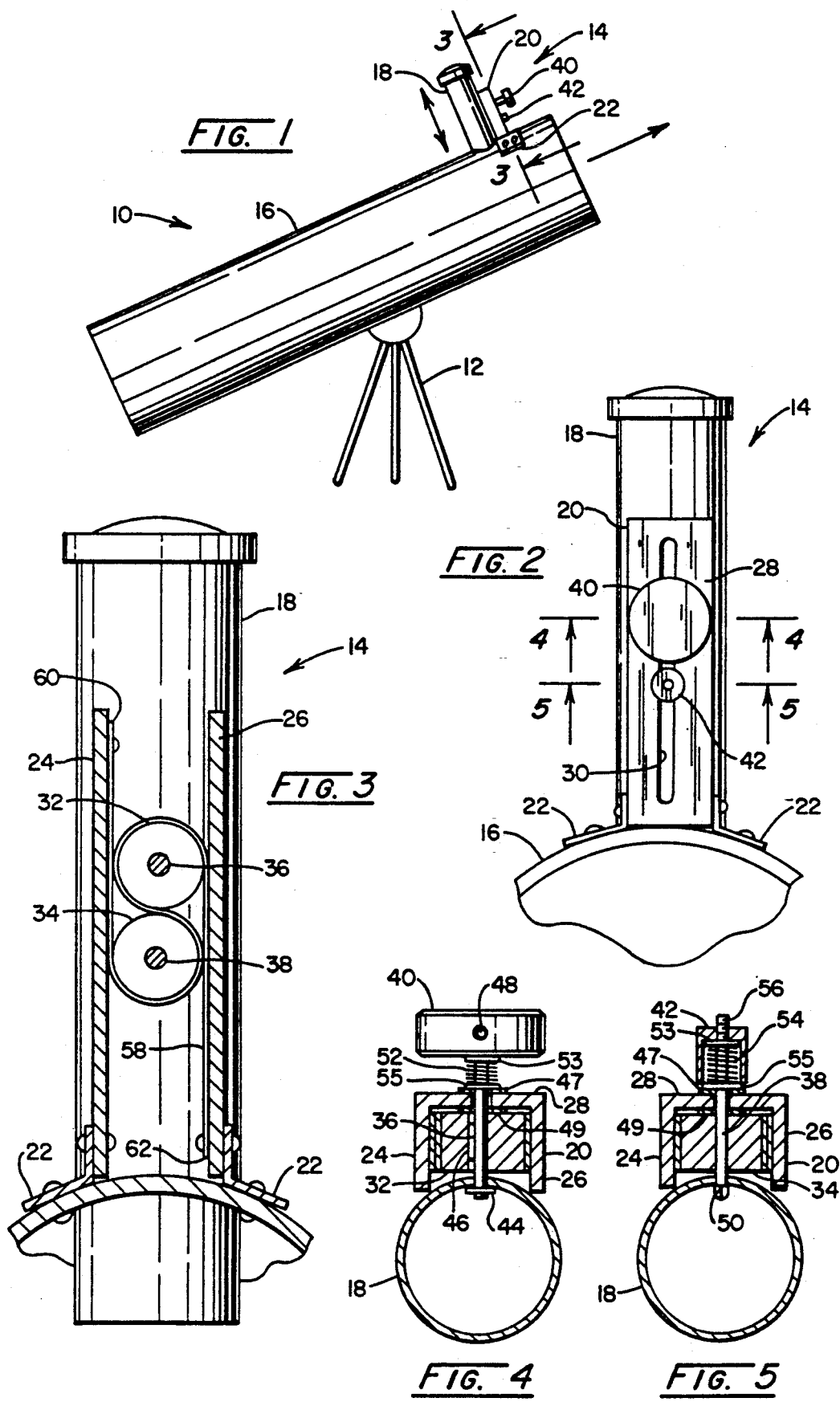

LENS FOCUSING ADJUSTMENT MECHANISM

FIELD OF THE INVENTION

This invention relates to a mechanism for adjusting the focus of a lens system used in association with a microscope, telescope or the like.

BACKGROUND OF THE INVENTION

Conventional focusing apparatus for a lens system involving telescopes, microscopes, cameras and the like includes the lens system mounted in a framework, ordinarily a tube, and a transversely mounted adjusting mechanism to focus the lens system on the object to be observed or photographed. Numerous systems have used a rack and pinion or gear systems to move the lens system to the proper focus. The problem is that a gear system inherently includes a frictional relationship and a back lash due to material stress is inherent. Such back lash can make the best focus a difficult chore for the observer.

An example of an early focusing mechanism is in U.S. Pat. No. 1,120,014 showing a rack and pinion operation including gears as a mechanism for adjusting the focus of a lens system.

U.S. Pat. No. 1,521,067 is a modification of a lens adjusting system involving overlapping offset bands of woven material used to translate the lens system into the desired focus.

U.S. Pat. No. 1,576,340 shows a transverse offset mechanism for a lens system involving rollers riding on a rail and engaging alternate rollers to swing the lens system focus up and down or to one side or the other.

U.S. Pat. No. 3,768,885 involves a microscope. For focus adjustment a mechanical linkage and a rotatable cam are combined with a gear train. The whole system is much more complicated than necessary.

U.S. Pat. No. 4,204,732 describes adjusting the focus of a lens system by the use of gears. The inherent back lash problem is well known and undesirable.

U.S. Pat. No. 4,591,245 discloses adjusting the focus of a lens system using a threaded rod combined with a cam or lever system to move the lens system. Threads serve essentially the same function as gears in the above described patents and do not eliminate the undesirable back lash.

A column in the May, 1986 journal, Sky & Telescope, at pages 511-513 describes a focusing apparatus involving a lens mounted in a tube. A flat area on the tube exterior is aligned with a rubber tube surrounding a focusing shaft. Rotation of the shaft moves the tube to the desired focus location.

Another column in the January, 1987 journal, pages 95-96 describes a similar focusing technique, but in the latter case a rubber strip is adhesively bonded to the tube in place of the flat area described in the May, 1986 column.

An article from the journal, Machine Design, of Dec. 21, 1967 describes the dynamic features of a flexible band threaded in S-shaped configuration around two rollers and anchored to a pair of plates. The plates are aligned in parallel with each other and perpendicular to the axes of the rollers. The initial tension of the band is sufficient to capture the rollers for non-slip movement thereof.

SUMMARY OF THE INVENTION

This invention involves a lens system mounted in a tube having attached thereto a rail with the tube and rail being relatively moveable in a plane parallel to the axis of the tube.

A pair of rollers or wheels are mechanically secured to the tube by axles and at least one of the axles passes through a slot in the rail. The slot extends parallel to the axis of the tube. Thereby, when the tube and rail are moved relative to each other, the axle and slot combine to keep (1) the rail, slot and tube axis aligned parallel with each other and (2) the axle passing through the slot perpendicular to the axis of the tube.

A knob on the end of the axle projecting through the slot provides a positive drive mechanism for its associated wheel. Rotation of the drive wheel translates into relative movement between the tube and the rail by the use of a strap mechanically secured at each of its ends to the rail. One end of the strap is mechanically secured and projects around the periphery of the most remote wheel, back between the two wheels and around the wheel which is nearest to the one attached strap end, around the closest wheel and then back along the rail to the other end of the strap which is also mechanically attached to the rail. The strap has sufficient tension in it and the strap and surface of the wheels in combination have adequate friction to eliminate slippage upon rotation of the drive wheel.

The axle of the second or idler wheel also projects through the slot and it has a second knob on that end. The second knob is threadedly engaged with its axle and a tightening of the second knob against the surface of the rail locks the rail, wheels and tube against relative movement. This can be of use when the operator does not want the apparatus to be moved from a specific focus. An example is when the operator uses the apparatus to get the correct focus by manual observation through the lens, and thereafter, wishes to photograph the subject. Cameras are relatively heavy and could cause a malfunction or misfocus of the lens system due to the weight of the camera itself and the mechanical effort of mounting the same in operative position to take the photograph. The second knob and axle combination having the ability to lock the wheels and tube against relative longitudinal movement allows the subject to be photographed without any concern that the lens system has been moved from its desired focus.

An alternative embodiment reorients the wheels and rail whereby there is no mechanical attachment of the axles directly to the lens mounting tube. However, the operating principle of the tensioned strap traversing a pair of wheels in generally an S-shaped configuration to provide the tube adjustment mechanism for lens focusing remains the same.

Objects of the invention not clear from the above description will be fully understood by a review of the drawings and the description of the preferred embodiments which follow.

BRIEF DESCRIPTION OF THE DRAWING

FIG. 1 is a side elevational view of a conventional telescope having a novel lens adjustment system of this invention mounted transversely of the main tube;

FIG. 2 is a side elevational view of the lens system adjustment mechanism from FIG. 1;

FIG. 3 is a fragmentary sectional view taken along line 3—3 of FIG. 1;

FIG. 4 is a sectional view taken along line 4—4 of FIG. 2;

FIG. 5 is a sectional view taken along line 5—5 of FIG. 2;

DESCRIPTION OF THE PREFERRED EMBODIMENTS

Figure 6:
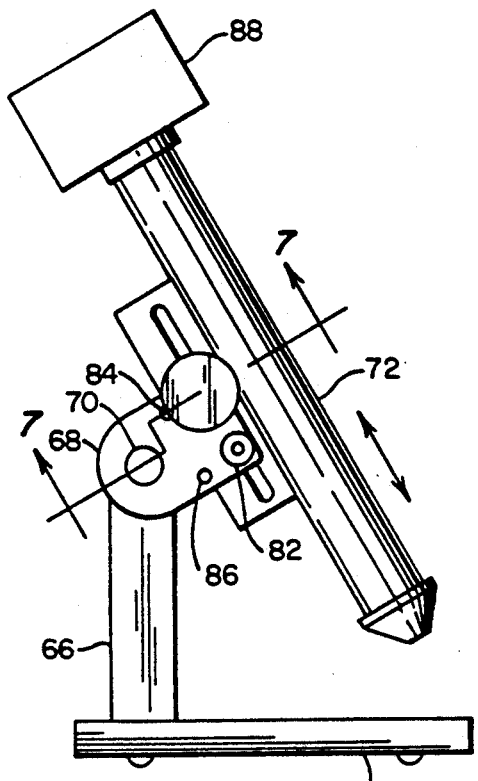
FIG. 6 is a side elevational view of a microscope using the focus adjusting mechanism of this invention.

FIG. 1 is a somewhat schematic representation of a telescope 10 mounted on a tripod 12 having a lens system and focus adjustment mechanism 14 mounted transversely to the axis of the main telescope body 16. The lens and mirror combination inside telescope body 16 are conventional and need not be described here because they comprise no part of the inventive concept.

Looking now to FIGS. 2-5, the lens system, which is also conventional, is mounted in a tube 18 which is secured to a rail 20 in a fashion which allows relative movement between the tube and the rail along a plane parallel to the axis of tube 18.

One end of rail 20 includes a pair of diverging feet 22 which are configured to fit on and be attached to the surface of telescope body 16.

The rail 20 shown in the drawings is U-shaped in configuration including a pair of spaced apart, parallel plates 24, 26 bridged by a beam 28.

A slot 30 extends through beam 28 and is aligned parallel with the axis of tube 18.

A pair of wheels or rollers 32, 34 are operably mounted in the cavity formed by the U-shaped rail 20 and the surface of tube 18. Each wheel has an axle 36, 38, respectively, projecting from inside the tube 18, along the axis of its associated wheel and through slot 30 to a knob 40, 42, respectively.

FIGS. 4 and 5 illustrate one embodiment of the structural relationships between the wheels and axles. Axle 36 extends through an opening in tube 18 and is secured against removal by a clip 44 which allows axle 36 to rotate relative to tube 18. Rotation between wheel 32 and axle 36 is precluded by connecting splines 46, and knob 40 is secured against relative rotation with respect to axle 36 by a set screw 48. The structure allows wheel 32 to be a drive wheel which will be explained in more detail subsequently. Axles 36, 38 are circumscribed by a pair of Teflon washers 47, 49 which sandwich beam 28 therebetween. This allows relatively frictionless sliding of the parts.

Wheel 34 is an idler wheel and it is mounted on axle 38 so as to rotate about the axle because axle 38 is precluded from rotation by the splines 50 securing it to the tube 18.

Both axles 36 and 38 include a biasing spring 52, 54, respectively, circumscribing the axle and biasing the associated knob away from rail 20. Each spring is sandwiched between a pair of rigid washers 53, 55. Rail 20 is biased into contact with the surface of tube 18 by springs 52, 54 but not with great force. The rail 20 and tube 18 move easily with minimal sliding frictional contact by plates 24, 26 against tube 18.

Knob 42 may be tightened on interengaging threads 56 on axle 38 to press against beam 28 and force the edges of plates 24 and 26 against the surface of tube 18 and preclude longitudinal movement between the tube and the rail 20. Similarly, the tightening of knob 42 clamps the rail 20 between the knob 42 and wheel 34 which prevents relative movement between tube 18 and the wheels 32, 34.

A strap or strip 58 of thin metal or plastic has its two ends 60 and 62 mechanically secured to one or the other of the rails 24, 26 and curves around wheels 32, 34 in a generally S-shape to function in a manner which will be explained subsequently. Noting FIG. 3, strip 58 projects from its one end 60 to the most remote of the two wheels, in this case idler wheel 34; around the periphery of idler wheel 34 to pass between the two wheels; around the periphery of drive wheel 32; and back past idler wheel 34 along plate 26 to its opposite end 62 where it is secured to plate 26.

It is intended that rotation of the drive wheel 32 by manual manipulation of knob 40 will frictionally drive strap 58 in one direction or the other and thereby cause relative movement between tube 18 and rail 20 to allow the user to focus the lens system in tube 18 on the subject. In order to do this and to insure smooth easy focusing, there must be adequate tension in strap 58 and appropriate friction between the strap 58 and the wheels 32, 34. Accordingly, a screw-type adjustment (not shown) at one end 60 or 62 of the strap allows tension in the strap to be adjusted as desired. It has been found that rollers constructed of wood, plastic, metal, rubber or having a rubber coating thereon will perform satisfactorily with a metal or plastic strap having a thickness which is relatively small as compared to its width. The preferred material for the wheels or the coating on the periphery of the wheels is some commercially available elastomer such as neoprene, silicone rubber and natural rubber where the contact surface of the wheel with the strap 58 has a Shore Hardness of about 70. The preferred strip material is steel shim stock, SAE 1010, having a thickness of about 0.002 inch.

Figure 7:
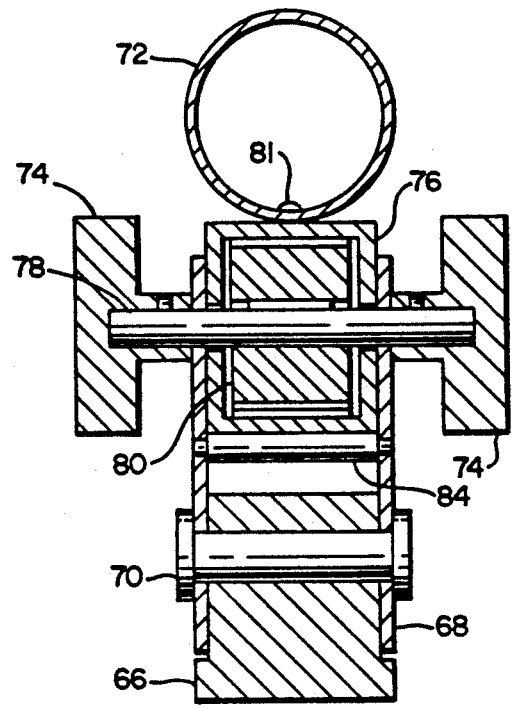
FIG. 7 is a sectional view taken along line 7—7 of FIG. 6.

Looking now to FIGS. 6 and 7, a second embodiment is shown. It should be stated that the operating principles are the same. A microscope is mounted on a base 64 having an upright mounting standard 66. A yoke 68 is secured to standard 66 by a pin 70 which allows the yoke to tilt with respect to standard 66. Thereby the main body 72 of the microscope is aligned with the appropriate subject matter.

FIG. 7 illustrates that knobs 74 are mounted on each side of rail 76 and axle 78 is mechanically connected to drive wheel 80 to prevent relative rotation between the two. A second knob 82 is threadedly secured to a second axle which, in turn, supports an idler roller in essentially the same fashion as illustrated in FIGS. 2-5 for idler roller 34.

In FIG. 7 it will be observed that rail 76 is a box which is secured to tube 72 by screws 81 or the like. The surface of rail 76 which is remote from tube 72 rides on a pair of roller bearings 84, 86 journaled in the side plates of yoke 68.

It is believed that the operation of the microscope focusing mechanism illustrated in FIGS. 6 and 7 is self-evident based on the description of the working embodiment illustrated in FIGS. 1-5 and no further explanation appears necessary. It will be clear that the particular structure used for the fine tuning, easy movement of the strap and drive wheel combination, has a very low friction and because of the easy movement, should the operator wish to mount a camera 88 to photograph the subject in focus in the lens system of the microscope (or telescope) the mounting of the camera 88 could cause movement of the microscope body 72 which would take it out of proper focus. The locking mechanism for FIGS. 6 and 7 operates in the same way as described in relation to FIG. 5 and accordingly will prevent this out of focus inconvenience.

Figure 8:
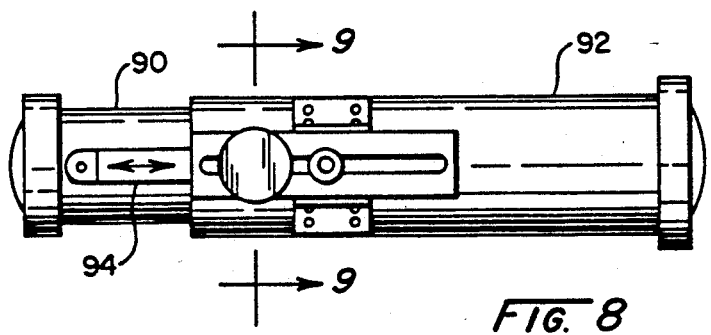
FIG. 8 is a top plan view of a hand holdable telescope incorporating the focusing apparatus of this invention.
Figure 9:
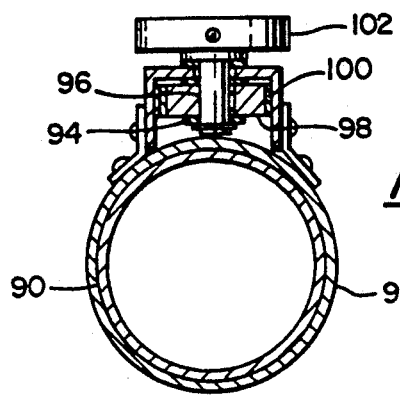
FIG. 9 is a sectional view taken along line 9—9 of FIG. 8.

FIGS. 8 and 9 illustrate a hand held telescope involving reciprocal tubes 90, 92 held together by a bar 94. FIG. 9 illustrates bar 94 connected to axle 96 of drive roller 98. Strap 100 operates in the same fashion as strap 58. Rotation of knob 102 turns drive roller 98 and strap 100 pulls axle 96, bar 94 and tube 90 in one direction or the other.

Having thus described the invention in its preferred embodiment, it will be clear that modifications may be made without departing from the spirit of the invention. Also the language used to describe the inventive concept and the drawings accompanying the application to illustrate the same are not intended to be limiting on the invention. Rather it is intended that the invention be limited only by the scope of the appended claims.

I claim:

1. A lens focusing adjustment mechanism comprising,
a lens mounted in a tube, said tube having an axis,
a rail mounted on said tube,
said rail being aligned for movement parallel with said tube axis,
a slot in said rail, said slot being aligned parallel with said tube axis,
a pair of wheels having circular peripheries mounted on said rail and including an axle on the axis of rotation of each of said wheels,
one said axle extending through said slot, said one axle having a knob at one end,
said rail being located between said knob and said wheels,
said knob and its associated wheel and axle being secured to rotate together, said associated axle being mounted to rotate relative to said tube,
a strap having a width greater than its thickness and having its ends secured to said rail, said strap extending from one said end (1) to the peripheral surface of the most remote of said two wheels, (2) around the peripheral surface of said remote wheel and between the two wheels, (3) around the peripheral surface of the wheel closest to said one secured end and (4) past said remote wheel to its other secured end,
said strap having adequate tension to prevent relative movement between the contacting surfaces of said wheels and said strap upon rotation of said associated wheel and knob.

2. The lens focusing adjustment mechanism of claim 1 including a second knob, said second knob being mounted on the axle of the other of said wheels and with the rail located between said second knob and said other wheel,
said second knob being mounted on its axle by means for locking the tube and wheels against relative movement.

3. The lens focusing adjustment mechanism of claim 2 wherein said locking means comprises engaging threads between said second knob and its associated axle allowing said second knob to be tightened to clamp said rail between said second knob and one of said wheels.

4. The lens focusing adjustment mechanism of claim 3 wherein said wheels are comprised of wood, plastic, metal, rubber or have a rubber coating at their periphery.

5. The lens focusing adjustment mechanism of claim 4 wherein said strap is thin flexible metal or plastic.

6. The lens focusing adjustment mechanism of claim 5 wherein said wheel material or peripheral coating is selected from the group comprising neoprene, silicone rubber and natural rubber, said material or coating having a Shore Hardness of about 70.

7. The lens focusing adjustment mechanism of claim 6 wherein said strap is shim stock steel, SAE 1010, having a thickness not substantially greater than about 0.002 inch.

8. The lens focusing adjustment mechanism of claim 7 wherein the mechanism is used in association with a camera, said camera being mounted on said tube axially aligned with said lens for photographing subjects after said tube and wheels have been locked against relative movement.

9. The lens focusing adjustment mechanism of claim 5 wherein said strap is shim stock steel, SAE 1010, having at thickness not substantially greater than about 0.002 inch.

10. The lens focusing adjustment mechanism of claim 3 wherein the mechanism is used in association with a camera, said camera being mounted on said tube axially aligned with said lens for photographing subjects after said tube and wheels have been locked against relative movement.

11. The lens focusing adjustment mechanism of claim 1 wherein the mechanism is used in association with a camera, said camera being mounted on said tube axially aligned with said lens for photographing subjects after said tube and wheels have been locked against relative movement.

12. The lens focusing adjustment mechanism of claim 1 wherein said wheels are comprised of wood, plastic, metal, rubber or have a rubber coating at their periphery.

13. The lens focusing adjustment mechanism of claim 12 wherein said strap is thin flexible metal or plastic.

14. The lens focusing adjustment mechanism of claim 13 wherein said wheel material or peripheral coating is selected from the group comprising of neoprene, silicone rubber and natural rubber, said material or coating having a Shore Hardness of about 70.

15. The lens focusing adjustment mechanism of claim 14 wherein said strap is shim stock steel, SAE 1010, having a thickness not substantially greater than about 0.002 inch.

16. The lens focusing adjustment mechanism of claim 13 wherein said strap is shim stock steel, SAE 1010, having a thickness not substantially greater than about 0.002 inch.

17. The lens focusing adjustment mechanism of claim 12 wherein said wheel material or peripheral coating is selected from the group comprising of neoprene, silicone rubber and natural rubber, said material or coating having, a Shore Hardness of about 70.

18. The lens focusing adjustment mechanism of claim 12 wherein said strap is shim stock steel, SAE 1010, having a thickness not substantially greater than about 0.002 inch.

19. The lens focusing adjustment mechanism of claim 1 wherein said strap is thin flexible metal or plastic.

20. The lens focusing adjustment mechanism of claim 19 wherein said strap is shim stock steel, SAE 1010, having a thickness not substantially greater than about 0.002 inch.

* * * * *